United States Patent [19]

Nagatomo et al.

[11] Patent Number: 4,497,240
[45] Date of Patent: Feb. 5, 1985

[54] TEMPERATURE CONTROL DEVICE FOR A VEHICLE CABIN

[75] Inventors: Hideaki Nagatomo; Mitsuo Yasuda; Seiji Kubo, all of Shizuoka, Japan

[73] Assignee: Mitsubishi Denki Kabushiki Kaisha, Tokyo, Japan

[21] Appl. No.: 510,889

[22] Filed: Jul. 5, 1983

[30] Foreign Application Priority Data

Aug. 20, 1982 [JP] Japan ................. 57-144221

[51] Int. Cl.³ ............... B60H 1/00; F24F 7/00
[52] U.S. Cl. ...................... 98/2.01; 62/235.1; 62/236; 236/49
[58] Field of Search ............ 236/49; 62/235.1, 236; 98/2.01, 2.18, 39, 43 R

[56] References Cited

U.S. PATENT DOCUMENTS

| | | | |
|---|---|---|---|
| 3,353,191 | 11/1967 | Dahly | 62/235.1 |
| 3,943,726 | 3/1976 | Miller | 62/235.1 |
| 4,354,574 | 10/1982 | Diesel | 137/509 X |
| 4,367,633 | 1/1983 | Strathman | 62/235.1 |

Primary Examiner—William E. Wayner
Attorney, Agent, or Firm—Oblon, Fisher, Spivak, McClelland & Maier

[57] ABSTRACT

A temperature control device for a vehicle cabin comprises a duct which communicatively connects, at least, inside the vehicle cabin and the external atmosphere; a damper provided within the duct and for shutting off flow of air inside and outside the vehicle cabin; drive means for driving the damper to open and close; a fan to produce the air flow within the duct; a fan motor to actuate and drive the fan; detecting means to detect temperature changes within the vehicle cabin; and a power source separately provided from an ordinary power source and for supplying power to the fan motor. A temperature increase within the vehicle cabin above a predetermined temperature is detected by the detecting means, then electric power is supplied to the fan motor from the separately provided power source, and the temperature within the vehicle cabin is controlled in utilization of the duct, in which the damper is in an open state.

5 Claims, 5 Drawing Figures

TEMPERATURE CONTROL DEVICE FOR A VEHICLE CABIN

This invention relates to a temperature control device, and more particularly, it is concerned with a control device for inhibiting abnormal increase in temperature within a vehicle cabin such as, for instance, an abnormal temperature rise within a cabin of an automotive vehicle in stoppage under a scorching heat of the sun.

A damper for introducing external air or circulating internal air and a blower (or fan) for the air flow within the vehicle cabin have heretofore been in such a construction as shown in FIG. 1 of the accompanying drawing. That is to say, in FIG. 1, a reference numeral 1 designates an internal and external air change-over damper, a numeral 2 refers to a blower for air flow within the vehicle cabin, a numeral 3 denotes a cooling-/heating unit, a numeral 4 indicates a blower switch, a numeral 5 represents an ignition switch, and a reference numeral 6 designates a battery. The operations of the airflow damper and the air blower are such that, by turning-on of the ignition switch 5, the power source 6 for the vehicle is connected, and, by turning-on of the blower switch 4, the cabin air blower 2 is first rotated. In this case, the internal air is circulated in the vehicle cabin or the external air is introduced thereinto by operating the internal and external air change-over damper 1 through manual operation of a driver or a negative pressure occurred in the engine of the vehicle.

According to such construction of the damper/-blower unit, however, the air flow within the vehicle cabin stops as soon as the ignition switch 5 is turned off to disconnect the power source for the vehicle. In this motionless state of air, if the vehicle is left in stoppage under scorching heat of the sun, the temperature within the vehicle goes up to 70° C. or so, even when the temperature in the external atmosphere is at 30° C. or so. On account of this, when an automotive vehicle which has been packed under such immense heat of the sun for a fair length of time is to be driven, passengers on the car would feel disagreeable and a great deal of load is imposed on the air-conditioning of the vehicle cabin, which invites considerable loss of energy in the cooling unit. In other way, even if the windows, etc. of the car are opened for avoiding the rise in temperature within the cabin, when it is to be parked, no appreciable effect can be expected, but other disadvantage would occur in the aspect of safety such as pilferage of personal properties left within the vehicle cabin.

In view of the above-described disadvantage inherent in the conventional air-damper/blower unit, it is an object of the present invention to provide an improved temperature control device for the vehicle cabin.

It is another object of the present invention to provide an improved air-damper/blower unit of a construction which is capable of automatically detecting temperature rise within the vehicle cabin and operating the air conditioning device to cool down the temperature therewithin so that passengers may not feel any discomfortableness when they get into it.

According to the present invention, in general aspect of it, there is provided a temperature control device for a vehicle cabin which comprises, in combination: a duct which communicatively connects, at least, inside the vehicle cabin and the external atmosphere; a damper provided within said duct and for shutting off flow of air inside and outside the vehicle cabin; drive means for driving said damper to open and close; a fan to produce the air flow within said duct; a fan motor to actuate and drive said fan; detecting means to detect temperature changes within said vehicle cabin; and a power source separately provided from an ordinary power source and for supplying power to said fan motor, wherein a temperature increase within said vehicle cabin above a predetermined temperature is detected by said detecting means, then electric power is supplied to said fan motor from said separately provided power source, and the temperature within the vehicle cabin is controlled in utilization of the duct, in which said damper is in an open state.

The foregoing objects, other objects as well as the specific constructions and operations of the temperature control device according to the present invention will become more apparent and understandable from the following detailed description thereof when read in connection with the accompanying drawing.

In the following, the present inventin will be described in detail in reference to the accompanying drawing showing the preferred embodiments thereof.

General outline and details of the construction of the temperature control device according to the first preferred embodiment of the present invention will be explained in reference to FIGS. 2, 3 and 4.

Figure 1:
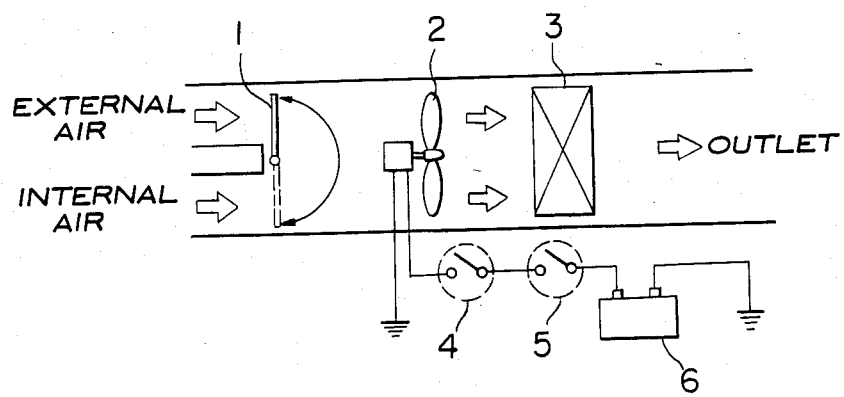
FIG. 1 is a schematic diagram showing a construction of a conventional internal/external air change-over damper and vehicle cabin blower unit.
Figure 2:
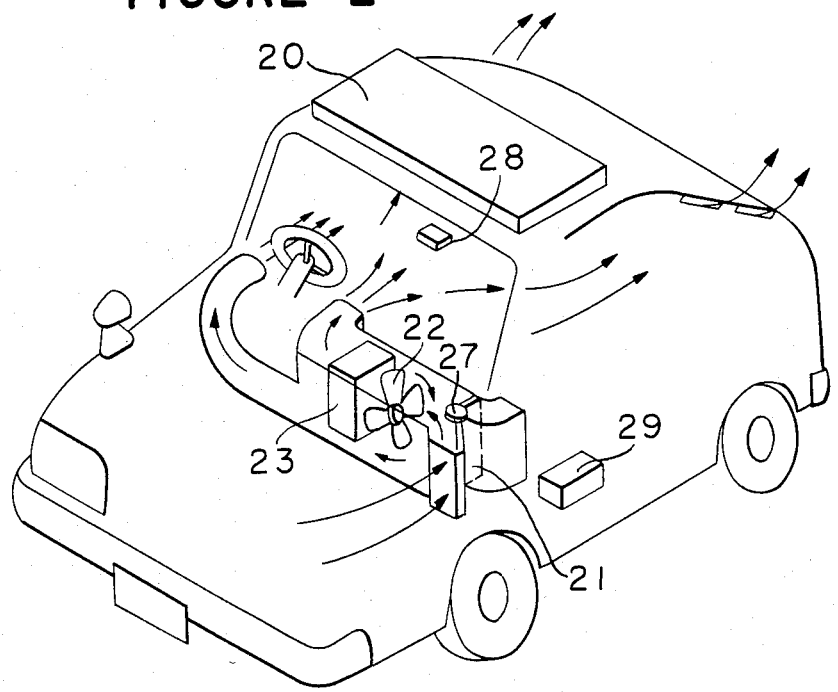
FIG. 2 is a schematic perspective view showing an overall construction of the temperature control device according to one embodiment of the present invention.
Figure 3:
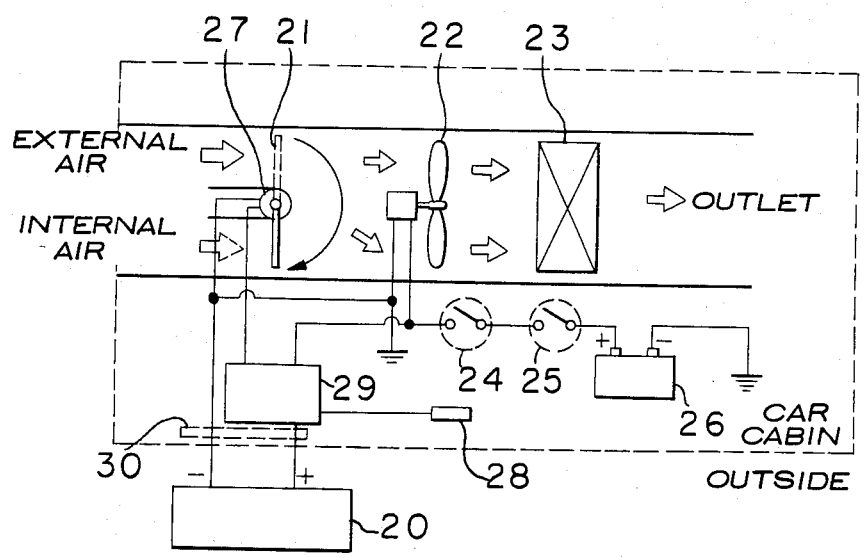
FIG. 3 is a schematic diagram showing a construction of a temperature control device for a vehicle cabin according to the preferred embodiment of the present invention, in which a solar battery is used.

Referring to FIGS. 2 and 3, a reference numeral 21 designates an internal/external air change-over damper, a numeral 22 refers to a vehicle cabin blower (fan), a numeral 23 refers to a cooling unit, a numeral 24 denotes a blower switch, 25 represents an ignition switch, 26 denotes a battery as an ordinary power source, 27 a stepping motor, 28 a temperature sensor as the detecting means, and 29 refers to a control circuit. A solar battery 20 is, at least, independent when the battery 26 and the vehicle cabin blower 22 are taking supply of electric power from this solar battery 20. The operations of the unit shown in FIG. 3 are such that, when the temperature in the vehicle cabin rises above a set temperature level, the temperature sensor 28 provided in the vehicle cabin detects this temperature rise, and transmits the detected result to the control circuit 29. Then, the control circuit 29 first drives the stepping motor 27 with electric power produced by the solar battery 20 mounted on the external part of the vehicle such as the roof top thereof, etc. to thereby change the internal/external air change-over damper 21 over to the introduction of the external air into it, and actuates the vehicle cabin blower 22 irrespective of turn-on and turn-off of the blower switch 24. When the temperature in the vehicle cabin becomes lower than the set temperature level, the temperature sensor 28 senses the decrease, and transmits the detected result to the control circuit 29, whereupon the control circuit 29 disconnects the power supply to the vehicle cabin blower 22. Thus, the vehicle blower 22 stops its operation.

Since the embodiment according to the present invention is constructed as memtioned in the foregoing, the temperature within the vehicle cabin can be maintained at a level in the vicinity of the set temperature or at a level slightly higher than the external temperature without consumption of the battery 26, even if the vehicle is left in stoppage under scorching heat of the sun with its windows being in full closure, thereby preventing abnormal temperature rise from taking place.

Figure 4:
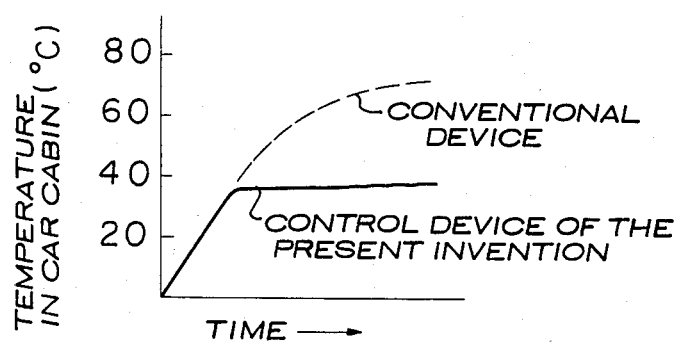
FIG. 4 is a graphical representation showing a relationship between time for operating the temperature control device according to the embodiment of the present invention and temperature changes in the vehicle cabin.

FIG. 4 indicates a relationship between time for operating the temperature control device of this embodiment at an external temperature of 30° C. and a set temperature of 35° C. and temperature changes in the vehicle cabin. From this graphical representation, it will be seen that the disagreeableness to the passengers in the vehicle can be lessened and the heat load on the vehicle body can be maintained low, whereby various remarkable effects can be attained such that energy loss at the time of the air conditioning can be avoided, and others.

In the above-described embodiment of the present invention, the temperature control in the vehicle cabin is effected by a difference between a temperature sensed by the temperature sensor which is provided in the vehicle cabin and a set temperature. It should, however, be noted that the same result can be obtained from a temperature difference between a separately provided external temperature sensor and the temperature sensor within the vehicle cabin. In the illustrated embodiment, the vehicle cabin blower is positioned at the air intake side of the cooling unit, although an reversed arrangement to this may produce the same result.

Furthermore, in the above-described embodiment, the vehicle cabin blower 22 is driven by use of electric power from the solar battery 20 alone. It should, however, be understood that this solar battery may be combined with the ordinary power source battery 26 to supply electric power within an extent that does not hinder normal driving of the automotive vehicle. Moreover, the solar battery 20 to drive the vehicle cabin blower 22 may also be combined with other secondary battery 30 different from the ordinary battery 26.

In the following, explanations will be given as to another embodiment of the present invention shown in FIG. 5. In the drawing, those parts which are identical or similar to those in FIG. 3 are designated by the same reference numerals. The point of different in this embodiment from the previous embodiment is that hot air in the vehicle cabin is made dischargeable outside the vehicle cabin.

Figure 5:
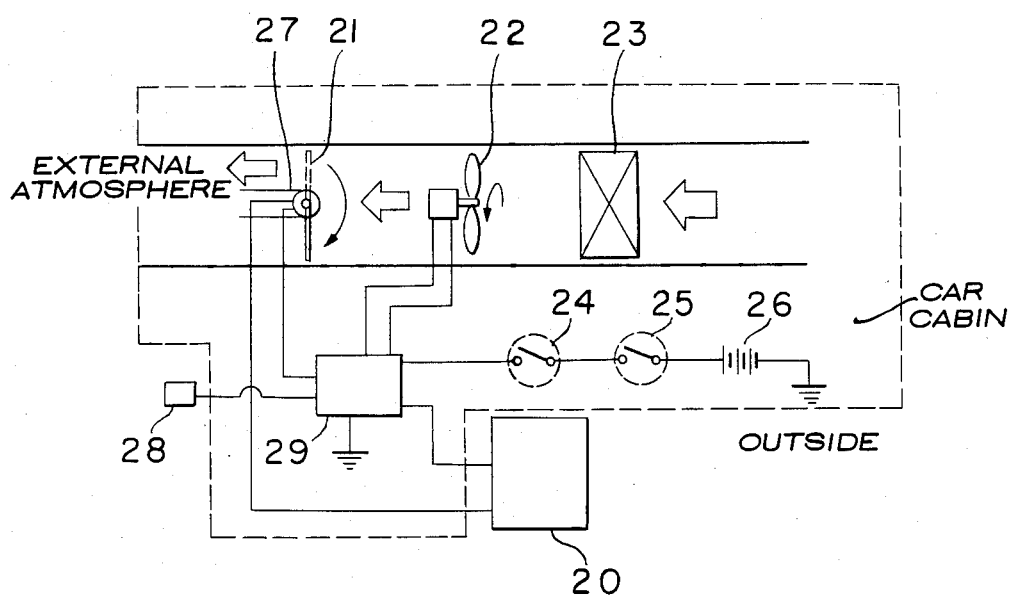
FIG. 5 is a schematic diagram showing a construction of a temperature control device for a vehicle cabin according to another embodiment of the present invention.

The operations of the temperature control device shown in FIG. 5 are as follows. That is to say, when the ignition switch 25 or the blower switch 24 is disconnected, and the sensor 28 senses a temperature rise in the vehicle cabin above a set temperature level, the damper is shifted to its position for external air introduction by means of the stepping motor 27, which is directly connected with the internal/external air changeover damper, through electromotive force generated in the solar battery 20 mounted on the vehicle, and, at the same time, back current is caused to flow in the motor for the blower 22 by means of the control circuit 29 to reversely rotate the blower fan, thereby discharging hot air in the vehicle cabin and inhibiting rise in the temperature within the vehicle cabin.

As explained in the foregoing, according to the present invention, since the temperature in the vehicle cabin can be maintained at a predetermined temperature level without unnecessary consumption in the ordinary power source, even when the vehicle is left for a long period of time under the immense heat of the sun, there is no necessity for opening the windows and the door of the vehicle for a long period of time, nor for excessive use of the air-conditioning device with the consequence that fuel consumption can be reduced, the effect of which is remarkable.

We claim:

1. A temperature control device for controlling the temperature of a vehicle cabin by regulating the operation of an existing vehicular air flow system independent of the operation of the ignition system of said vehicle wherein said existing vehicular air flow system has a duct for connecting the vehicle cabin with external atmosphere, a damper provided within said duct for shutting off flow of air within said duct, a fan to produce air flow within said duct and a fan motor to actuate and drive said fan, said temperature control device comprising;

drive means for driving said damper to open and close;

detecting means to detect temperature changes within said vehicle cabin; and a power source separately provided from said vehicle power source for supplying power to said fan motor whereby when said detecting means detects a temperature in said vehicle cabin which is higher than a predetermined temperature said detecting means outputs a signal to said separate power source and said separate power source supplies electric power to said fan motor to turn on said fan and also supplies electric power to said drive means for driving said damper and thereby inhibit the rise in temperature within said vehicle cabin.

2. The temperature control device for a vehicle cabin according to claim 1, wherein said separate power source to supply electric power to said fan motor is, at least, independent of the ordinary power source at the time of the power supply.

3. The temperature control device for a vehicle cabin according to claim 1, wherein said separate power source is a solar battery.

4. The temperature control device for a vehicle cabin according to claim 1, wherein said fan to be driven by said separate power source is rotated in the direction of introducing external air into the vehicle cabin.

5. The temperature control device for a vehicle cabin according to claim 1, wherein said fan to be driven by said separate power source is rotated in the direction to discharge hot air within the vehicle cabin outside thereof.

* * * * *